Oct. 28, 1958     M. SIMKULET ET AL     2,858,490

VARIABLE ELECTRIC CAPACITOR

Filed Dec. 22, 1954

INVENTOR:
MICHAEL SIMKULET,
CHARLES F. SPITZER,

BY George V. Eltgroth

THEIR ATTORNEY.

United States Patent Office 2,858,490
Patented Oct. 28, 1958

2,858,490

VARIABLE ELECTRIC CAPACITOR

Michael Simkulet, North Syracuse, and Charles F. Spitzer, Syracuse, N. Y., assignors to General Electric Company, a corporation of New York Application December 22, 1954, Serial No. 476,922

4 Claims. (Cl. 317—249)

This invention relates to electrical apparatus and, more specifically, to variable electric capacitors. Still more particularly, our invention relates to variable electric capacitors suitable for tuning purposes and having dielectric materials and electrode shapes chosen in such a way as to permit radical reductions in size as compared with prior-art capacitors of roughly equivalent capacitance.

As is well known in the art, it is customary to use variable capacitors for tuning purposes in many different types of circuits. In some circuits, e. g. certain military electronic apparatus, it is very important to reduce the size of components as far as is consistent with satisfactory performance. This is particularly true of tuning capacitors, which tend not only to be bulky but also to be rather expensive and delicate if air is used as the dielectric therein.

Accordingly, it is an object of our invention to provide a variable tuning capacitor which occupies a relatively small volume as compared with an air-dielectric tuning capacitor of comparable capacitance.

It is another object of our invention to provide a variable tuning capacitor which can be made more rugged and with less expense than a comparable air-dielectric capacitor.

Briefly, we have fulfilled the above-mentioned objects by building a tuning capacitor comprising a wafer of ferroelectric or other high-dielectric-constant material having on one side a series of radially disposed electrodes and on the other side an electrode of generally spiral external outline, and having adjustable means for connecting these electrodes respectively to a pair of terminals.

For additional objects and advantages, and for a better understanding of our invention, attention is now directed to the following description and the accompanying drawings. The features of the invention which are believed to be novel are particularly pointed out in the appended claims.

We have found that the volume required for a variable capacitor of a given capacitance can be drastically reduced and that durability can be substantially improved if the air dielectric previously employed is replaced by one of a class of so-called ferroelectric materials. This class of materials includes, among others, barium titanate, strontium titanate, and lead titanate, and has been termed ferroelectric because each of the materials within the class is characterized by a D—E curve which resembles in its shape the B—H curve of iron. That is to say, a plot of electric displacement or polarization of ferroelectric materials demonstrates that it is a non-linear function of applied voltage gradient. Such a plot may display a "hysteresis loop" resembling the plot of magnetic flux density in hard iron alloys as a function of applied magnetomotive force per unit length. In such an instance, for every moderately small value of abscissa of the curve, there are two values of ordinate, depending upon whether the applied force is increasing or decreasing. It will be understood that, since the existence of a "hysteresis loop" implies energy loss in the dielectric material, it is usually desirable to select a dielectric material which is characterized by as narrow a hysteresis loop as possible.

Another characteristic of the ferroelectric class of materials is a very high value of relative dielectric "constant" at ordinary temperatures. For instance, at room temperatures, barium titanate has a relative dielectric constant of at least 1200, as compared with relative dielectric constants of the order of 5 or 10 for such materials as glass or mica at the same temperatures. These values of dielectric constant are, of course, relative to that of air or vacuum, which is considered to be unity.

A ferroelectric dielectric wafer for a capacitor can be made by compressing and firing the desired amount of amorphous powder, such as commercially available barium titanate ($BaTiO_3$), until the material is hard. A suitable binder such as paraffin may be added to the amorphous material before firing, and during firing the temperature may be raised to the neighborhood of 1350 degrees C. If desired, other ferroelectric materials such as strontium titanate ($SrTiO_3$) or lead titanate ($PbTiO_3$) or mixtures thereof may be employed to form the dielectric wafer. Alternatively, any other material of high permittivity may be employed.

Figure 1:
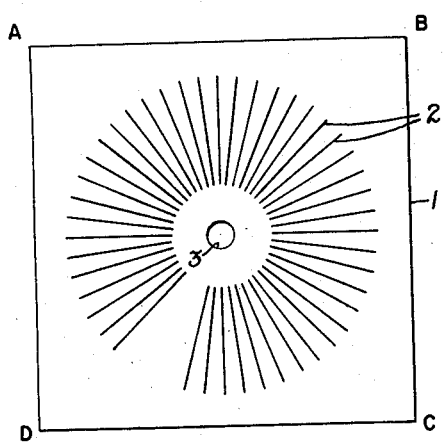
Figure 1 shows a top view of the dielectric wafer with radially disposed electrodes attached to it.

Turning now to the drawings, it will be seen that Figure 1 shows a wafer 1 of ferroelectric material on which are present a series of electrodes 2 each of which is in the form of a radial line of conducting material, and which are arranged in a substantially circular arc. These electrodes may be of silver or some other good conductor. If hardness is sufficiently important to justify the expense, platinum electrodes may be employed. A hole 3 penetrates the ferroelectric wafer at its center in order to accommodate a rotatable shaft or to receive a stud to secure the wafer to its housing.

Figure 2:
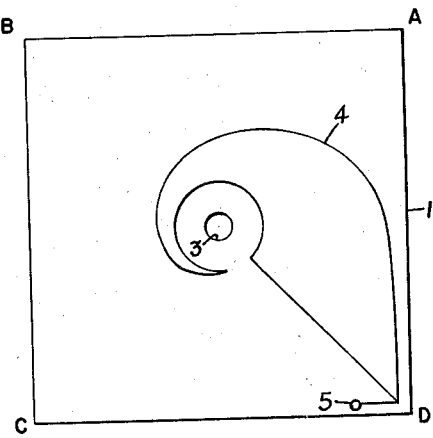
Figure 2 shows a bottom view of the dielectric wafer with an electrode having a spiral external shape attached thereto.

Figure 2 shows the reverse side of the ferroelectric wafer, bearing a conductive electrode 4 which may be so shaped and placed that it covers the area between a circle and a spiral, both of which are concentric with the hole through the ferroelectric wafer. Electrode 4 is conductively connected to a terminal 5 which may serve as one of the condenser terminals.

Figure 3:
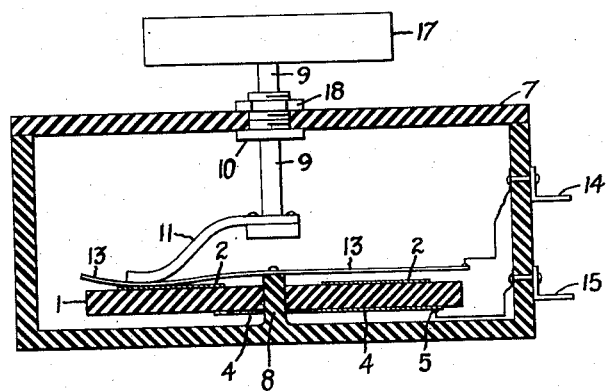
Figure 3 shows a side view of the entire capacitor assembly including the dielectric wafer, electrodes, and rotatable means for connecting the electrodes respectively to a pair of terminals and for varying the capacitance as seen between those terminals.

Figure 3 is a cross-sectional side view of the capacitor assembly, showing the means for varying the capacitance and showing the connections between the electrodes and terminals. It will be understood that the configuration shown is exemplary only and that other arrangements may be utilized within the terms of the appended claims. The figure shows a case 7 having within it and near the bottom thereof the ferroelectric wafer 1 to the top of which are fixed the radial electrodes 2 and to the bottom of which is fixed the spiral electrode. A stud 8 attached to case 7 is shown penetrating the hole in wafer 1, and holding the wafer in place. In Figure 3, wafer 1 is shown forced onto stud 8, but not far enough to reach the bottom of case 7. If desired, the space between wafer 1 and the bottom of case 7 may be filled with a nonconducting cement in order to lend additional strength to the condenser assembly. Alternatively, wafer 1 may be forced farther onto stud 8 so that electrode 4 contacts the bottom of case 7. A shaft 9 is shown penetrating the top wall of case 7 via a bushing having a shoulder 10 or equivalent means thereon. The usual C-washer prevents shaft 9 from being forced out of the bushing. The end of shaft 9 carries a wiper arm 11 which may be rigidly attached thereto and insulated therefrom bearing against the radial electrodes 2. If wiper arm 11 comes into actual contact with radial electrodes 2, it should be composed of a material which is preferably softer than radial electrodes 2 in order not to damage them in its rotation. In order to protect the radial electrodes, a conductive spring disc 13 may be interposed between wiper arm 11 and radial electrodes 2 in such a way that it makes electrical contact between the wiper arm and the electrode or electrodes under the outer end of the wiper arm. Since spring disc 13, when depressed by arm 11, makes contact with the radial electrodes but does not itself rotate, it protects the electrodes from the abrading action of the wiper arm which might otherwise damage them. It will be noted that, in the configuration of Figure 3, spring disc 13 is connected to one of the external terminals of the capacitor.

The operation of the variable capacitor of our invention will be understood by noting that, as wiper arm 11 is rotated about the axis of shaft 9, thereby depressing spring disc 13 to contact one or more of radial electrodes 2, the capacitance seen between external terminals 14 and 15 depends upon whether the radial electrode contacted is opposite a narrow part or a broad part of spiral electrode 4. If the width of wiper arm 11 is such that it depresses spring disc 13 to contact only one radial electrode at a time, the variation of capacitance with rotation of the wiper arm will be somewhat stepwise. Accordingly, we prefer to make the radial electrodes very narrow and closely spaced and the wiper arm relatively wide, so that more than one electrode will be contacted at a time and the variation of capacitance will be considerably smoothed out. Furthermore, it will then be assured that spring disc 13 will at all times be in contact with at least one radial electrode, and that any capacitance increment resulting from a small rotation of shaft 9 will be a small percentage of the total capacitance of the condenser. If desired, the radial electrodes 2 may, instead of being made all of equal length, be graduated in length, thereby permitting an extension of the range of available capacitances. It will be noted that the capacitance increments resulting from rotation of shaft 9 will be somewhat smoothed out by virtue of the stray capacitances between electrodes. A knob 17 or other device may be provided in order to facilitate rotation of shaft 9. The bushing secured by the nut 18 is provided to insure smooth rotation and freedom from wobble of shaft 9.

It will be evident that a number of capacitors according to our invention may be ganged together by means of a common shaft or with coupled shafts, thus increasing the total capacitance variation available. If a common shaft is used, it will be desirable to pass the shaft through the center holes of the various dielectric wafers, and to attach one or more wiper arms to the shaft for each dielectric wafer. Furthermore, a still more compact construction can be achieved by placing appropriate sets of electrodes concentrically on the same wafer of ferroelectric material and by using wiper arms mounted on concentric shafts. Alternatively, instead of making the electrodes concentric, one may place several electrodes of spiral contour on the same dielectric wafer by making each electrode occupy only a segment of the wafer and by providing a number of wiper arms equal to the number of spiral-shaped electrodes. If three or more such electrodes are thus disposed on a dielectric wafer, the wiper arms will form a star configuration. Such construction permits miniaturization far beyond that which would be possible with condensers having air dielectric. Any stray coupling between various sections of such a capacitor is held to a minimum by virtue of the high dielectric "constant" of the ferroelectric material. If it is desired to reduce the stray coupling between segment-type electrodes or between groups of radial electrodes, ground electrodes may be applied to the wafer between the segments or radial electrodes. Such ground electrodes may, if desired, be simply formed by use of a conducting paint. In this connection, it may be desirable to form case 7 of a conducting material in order to shield the capacitor from any external high-frequency potentials.

The specific embodiment which has been discussed in the paragraphs supra was chosen to illustrate the principles of our invention. As is well known to those skilled in the art, the disposition of elements may be varied somewhat to meet particular operating or environmental requirements without departing from the essence of our invention, which is defined by the appended claims.

That which we claim as novel and desire to secure by Letters Patent of the United States is as follows:

1. A variable electric capacitor comprising a wafer of dielectric material, a first electrode formed of a series of closely spaced narrow line-like elements disposed radially about a given point on said wafer on a first side of said wafer, a second electrode arranged in opposition to said first electrode on a second side of said wafer, one of said electrodes having a radial width which varies continuously with angular orientation about said center, rotatable contact means for selectively connecting successive substantially equal numbered pluralities of said line-like elements to a first terminal of said capacitor, said contact means having a substantially constant angular contact width, measured in the direction of rotation, spanning a plurality of said line-like elements, and means for connecting said second electrode to a second terminal of said capacitor.

2. A variable electric capacitor as set forth in claim 1 wherein said second electrode has a radial width which varies continuously with angular orientation about said center.

3. A variable electric capacitor as set forth in claim 1 wherein said movable contact means comprises a flexible member having a conducting surface arranged adjacent to said line-like elements and a sliding contactor slidable over said flexible member for causing localized contact between said flexible member and successive pluralities of said line-like elements.

4. A variable electric capacitor comprising a wafer of dielectric material, a first electrode formed of a series of closely spaced narrow line-like elements regularly arranged side by side in sequence on a first side of said wafer, a second electrode arranged in opposition to said first electrode on a second side of said wafer, one of said electrodes having a width which varies continuously as one progresses from one end to the other, translatable contact means for selectively connecting successive substantially equal numbered pluralities of said line-like elements to a first terminal of said capacitor, said contact means having a substantially constant width measured in the direction of translation, spanning a plurality of said line-like elements, and means for connecting said second electrode to a second terminal of said capacitor.

References Cited in the file of this patent

UNITED STATES PATENTS

| | | |
|---|---|---|
| 2,460,534 | Richards | Feb. 1, 1949 |
| 2,519,773 | Lee | Aug. 22, 1950 |
| 2,616,989 | Hepp | Nov. 4, 1952 |
| 2,678,435 | Vaughan | May 11, 1954 |
| 2,789,259 | Eisler | Apr. 16, 1957 |

FOREIGN PATENTS

| | | |
|---|---|---|
| 641,177 | Germany | Jan. 28, 1937 |
| 688,643 | Germany | Feb. 27, 1940 |